United States Patent [19]

Beer et al.

[11] Patent Number: 5,668,532
[45] Date of Patent: Sep. 16, 1997

[54] FAULT TOLERANT COOLING IN ELECTRICAL APPARATUS

[75] Inventors: Reginald Beer, Eastleigh; Stanley John Cutts, Petersfield; Steven Brian Kew, Portsmouth; Neil Morris, Southsea; David Newmarch, Romsey, all of England

[73] Assignee: International Business Machines Corporation, Armonk, N.Y.

[21] Appl. No.: 550,856

[22] Filed: Oct. 31, 1995

[30] Foreign Application Priority Data

Nov. 14, 1994 [GB] United Kingdom .................. 9422932

[51] Int. Cl.⁶ ........................................... G08B 29/00
[52] U.S. Cl. ........................... 340/506; 326/10; 340/679; 371/26; 395/182.09
[58] Field of Search ........................... 340/679, 506, 340/508; 361/685, 695; 326/10; 371/22.1, 26; 395/182.09, 182.1

[56] References Cited

U.S. PATENT DOCUMENTS

| | | | |
|---|---|---|---|
| 3,937,936 | 2/1976 | Saporito et al. | 395/182.09 |
| 4,422,067 | 12/1983 | Clark et al. | 340/508 |
| 4,843,378 | 6/1989 | Kimura | 340/508 X |
| 5,132,628 | 7/1992 | Matsuo | 340/508 X |

FOREIGN PATENT DOCUMENTS 0617570  9/1994  European Pat. Off.

*Primary Examiner*—Thomas Mullen
*Attorney, Agent, or Firm*—Richard E. Billion; Owen J. Gamon

[57] ABSTRACT

A cooling system provides redundant fault-tolerant cooling to electrical devices in an electrical apparatus and comprises a plurality N+1 individual cooling fans, N cooling fans being required to provide cooling of the devices and further comprises monitor logic for monitoring the status of the plurality of cooling fans and for issuing a non-critical warning to the apparatus in the event of failure of one of the cooling fans, the logic being further operable, in the event of a failure in the logic, to issue a non-critical warning to the apparatus.

21 Claims, 3 Drawing Sheets

5,668,532

1

FAULT TOLERANT COOLING IN ELECTRICAL APPARATUS

TECHNICAL FIELD OF THE INVENTION

The present invention relates to the provision of fault tolerant cooling in an electrical apparatus, e.g., a data storage subsystem.

BACKGROUND OF THE INVENTION

A current trend in the design of electrical systems, and especially data storage systems, is to modular system configurations wherein individual electrical units of the system are readily accessible and in some cases customer removable. The use of modular designs provides a number of different advantages. Manufacture and assembly is made simpler in that each unit can be manufactured and tested separately before being assembled in the complete system. Furthermore, if a removable unit becomes defective, it can be readily removed for repair and replaced with a working device. A typical multicomponent system of this type is a computing system in which data storage devices, processing hardware, power supplies and cooling fans are contained within a single support structure.

Although ease of removability of individual devices is facilitated using a modular configuration, the removal and replacement of a device usually requires the system to be closed down thus reducing the amount of time for which the system is available. Systems are beginning to come onto the market which allow for concurrent maintenance of various devices within the system. In this way a defective device can be removed for maintenance or replacement whilst allowing continued operation of remaining elements of the system.

Taking the example of disk file data storage system comprising removable disk files and associated power and cooling units, such systems are currently available which allow for the replacement of one or more of the disk files while maintaining operation of the remaining disk files. Furthermore, EP-A-617 570 describes a data storage system including replaceable cooling and power assemblies; the system housing being configured to permit removal of these assemblies without the need to remove the disk files. Although ease of access to various subassemblies within a modular electronic system is a prerequisite to achieving the desired aim of concurrent maintainability, it is also necessary to build redundancy into the system so that removal of a defective device providing a life support function to the system, e.g., a power supply or cooling assembly does not result in a shortage of power or overheating of the remaining devices. Systems are known which include a redundant array of cooling fans, where N fans are required to cool the system and therefore N+1 are fitted. One such system is described in EP-A-617 570. In the event of failure of one of the fans, the system can continue to operate while the defective fan is removed for repair or replacement.

Fault-tolerance is another desirable goal in today's high availability computer systems and networks. Fault tolerance is especially important in disk storage subsystems to ensure continuous availability of customer data, even in the event of failure of one of the components of the subsystem. Disk failure is catered for by the well known RAID (Redundant Array of Independent Disks) architecture. It is, however, a continuing technical challenge to design modular electronic systems and in particular data storage subsystems which achieve fault tolerance of components and electronics other than the disk drives.

DISCLOSURE OF THE INVENTION

The present invention seeks to address this requirement and accordingly provides, in a first aspect, a cooling system

2 for providing redundant cooling to electrical devices in an electrical apparatus, the cooling system comprising: a plurality N+1 individual cooling means, N cooling means being required to provide cooling of said devices; and monitor logic for monitoring the status of said plurality of cooling means and for issuing a non-critical warning to said apparatus in the event of failure of one of said cooling means, said logic being further operable, in the event of a failure in said logic, to issue a non-critical warning to said apparatus.

In a second aspect of the invention, there is a provided a data storage system comprising: a plurality of disk data storage devices; a plurality N+1 fan means for providing cooling in said system, N fan means being required to provide cooling of said devices; and fan monitor means for monitoring the status of said fan means, operable in the event of a failure in said monitor means to issue a non-critical failure warning to said system.

Thus, the present invention provides a cooling fault monitoring system which is capable of handling the situation where a failed fan is not immediately repaired and a second fan fails, and further of handling the situation where a failure occurs in the monitoring system itself. In particular, a comparison is made of the outputs of two component pans of the monitor logic and on detection of a discrepancy, a non-critical warning is issued but the system continues to operate. This is in contrast to the fault monitoring logic of known fault tolerant systems wherein a comparison is made between the outputs of identical systems and in the event of a discrepancy, the defective system is closed down. In these known systems, if the monitoring system develops a fault, then the whole system is closed down.

As will be discussed below in relation to a preferred embodiment of the invention, the present cooling fault monitoring system is adaptable for use in a data storage system containing a variable number of disk drives and fans. The fan monitor logic is designed to behave differently depending on the system configuration and is in particular adapted, in the event of an attempt to add a further disk drive to a system which does not have the requisite cooling capability, to prevent operation of the additional drive.

A preferred embodiment of the invention will now be described, by way of example only, with reference to the accompanying drawings.

DETAILED DESCRIPTION OF THE INVENTION

Figure 1:
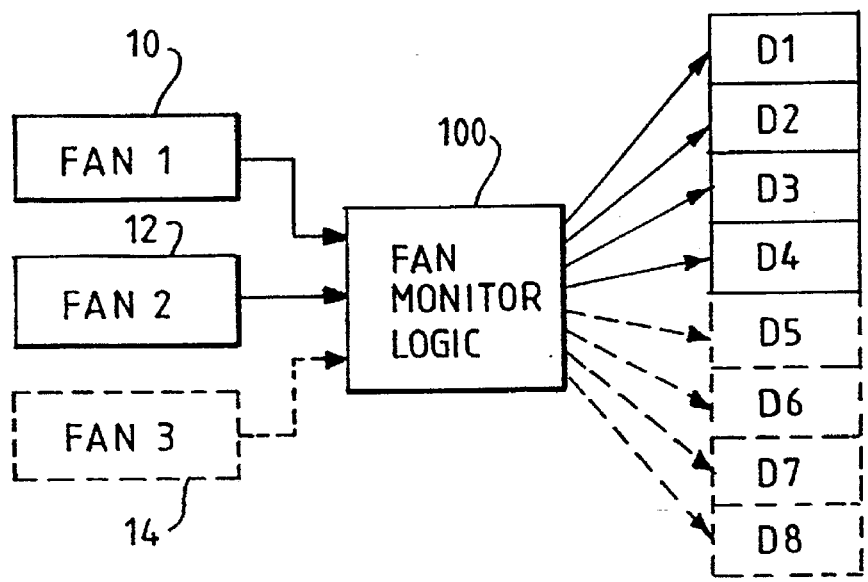
FIG. 1 is a schematic representation of a data storage subsystem including cooling fans, fan monitor logic and disk drives.

Referring first to FIG. 1, them is shown a schematic representation of a data storage subsystem embodiment of the present invention. An array of disk drive devices (D1 to D8) is cooled by a redundant array of cooling fans 10, 12, 14. Fan monitor logic 100 is connected to the fans to monitor fan status and, on occurrence of a fault in one or more of the fans, to indicate to a user of the system that a fault has occurred which may require remedial action. The type of fan is not critical to an understanding of the present invention, though one suitable type is described in EP-A-617 570.

The system of FIG. 1, in common with many data storage subsystems currently on the market, is modular in design thus allowing the customer to choose one of a number of configurations suited for a particular requirement. In one low-end configuration, indicated in FIG. 1, four disk drives (D1 to D4) are provided with two cooling fans (FAN1 and FAN2), only one of the fans being sufficient to cool the four devices. In a second configuration, the additional elements of which are indicated in shadow in FIG. 1, eight disk drives are provided with three cooling fans, two of the fans being sufficient to cool all eight drives. It will be appreciated that the various number of disk drives and fans in these two configurations is purely an example.

Figure 2A:
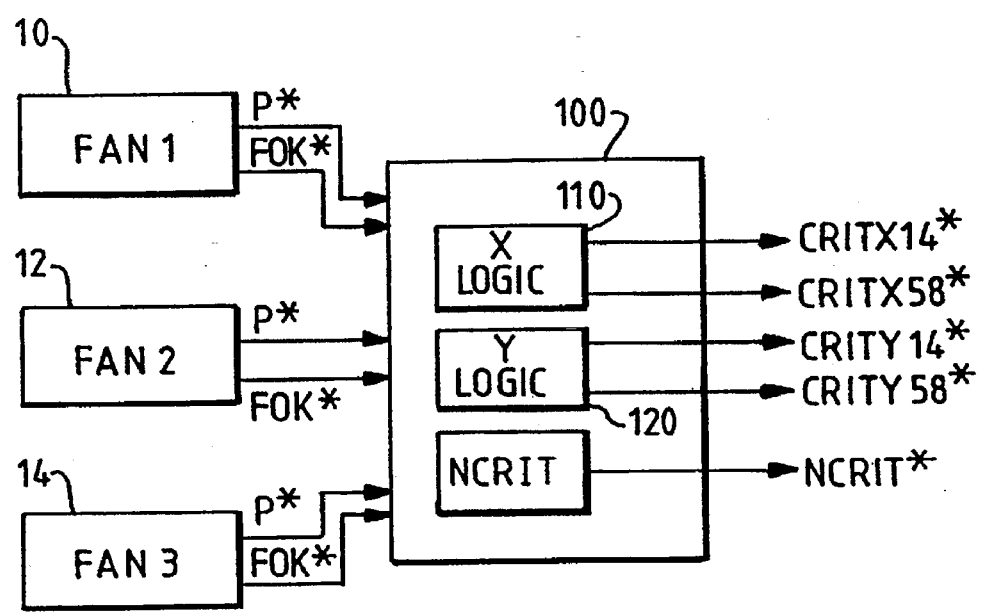
FIG. 2A is a schematic representation of the fans and fan monitor logic of FIG. 1.

FIG. 2A shows the fans and fan monitor logic of FIG. 1 in greater detail. Each fan has two status output pins: PRESENT* (P*) which is grounded if the fan is present, and FANOK* (FOK*) which is low if the fan is turning at an acceptable speed. The fan monitor logic is designed to be a combinatorial function with six inputs (two from each fan) and five outputs. These five outputs send status to the disk drives, each of which includes simple logic to report faults and to shut down power to the drive in the event of a critical fan fault. Because up to 4 drives can operate with a single fan, the fan monitor logic is designed to send a different set of fault signals to drives D1 through D4. This means that, even if two out of the three fans fail, the customer still has access to these four drives. Also, with a low-cost configuration described above wherein four drives are provided with a single fan, the fan monitor logic is designed to ensure that if a fifth drive is fitted without a second fan, the drive will not work.

The five fan monitor logic status signals are now described in more detail. One signal NCRIT* is active (low) if a non-critical fan fault occurs. The fan monitor logic is designed such that the other four signals provide a fault-tolerant (multiple path) indication of a critical fan fault. A pair of outputs CRITX14* and CRITY14* are active low if a fan fault occurs that is critical to disk drives D1 through D4. Another pair of outputs CRITX58* and CRITY58* are a modified version of CRITX14* and CRITY14* suitable for drives D5 through D8. The four critical signals are generated by two identical logic circuits. The "X" logic circuit 110 generates CRITX14* and CRITX58*. The "Y" logic circuit 120 generates CRITY14* and CRITY58*. All five signals are designed to be open-collector so that a second pair of "X" and "Y" logic circuits can be installed, if desired, to provide concurrent maintenance of the fan monitor logic.

The combinatorial logic is summarized in Table I below. The skilled man will be readily able to implement this logic in appropriate X and Y logic circuits.

TABLE 1

| FAN 1 | FAN 2 | FAN 3 | NCRIT* | CRITX58* | CRITY58* | CRITX14* | CRITY14* |
|---|---|---|---|---|---|---|---|
| NORM | | | 1 | 0 | 0 | 1 | 1 |
| FAULT | | | 0 | 0 | 0 | 0 | 0 |
| NORM | NORM | | 1 | 1 | 1 | 1 | 1 |
| FAULT | NORM | | 0 | 0 | 0 | 1 | 1 |
| NORM | FAULT | | 0 | 0 | 0 | 1 | 1 |
| FAULT | FAULT | | 0 | 0 | 0 | 0 | 0 |
| NORM | NORM | NORM | 1 | 1 | 1 | 1 | 1 |
| FAULT | NORM | NORM | 0 | 1 | 1 | 1 | 1 |
| NORM | FAULT | NORM | 0 | 1 | 1 | 1 | 1 |
| NORM | NORM | FAULT | 0 | 1 | 1 | 1 | 1 |
| FAULT | FAULT | NORM | 0 | 0 | 0 | 1 | 1 |
| NORM | FAULT | FAULT | 0 | 0 | 0 | 1 | 1 |
| FAULT | NORM | FAULT | 0 | 0 | 0 | 1 | 1 |
| FAULT | FAULT | FAULT | 0 | 0 | 0 | 0 | 0 |

Figure 2B:
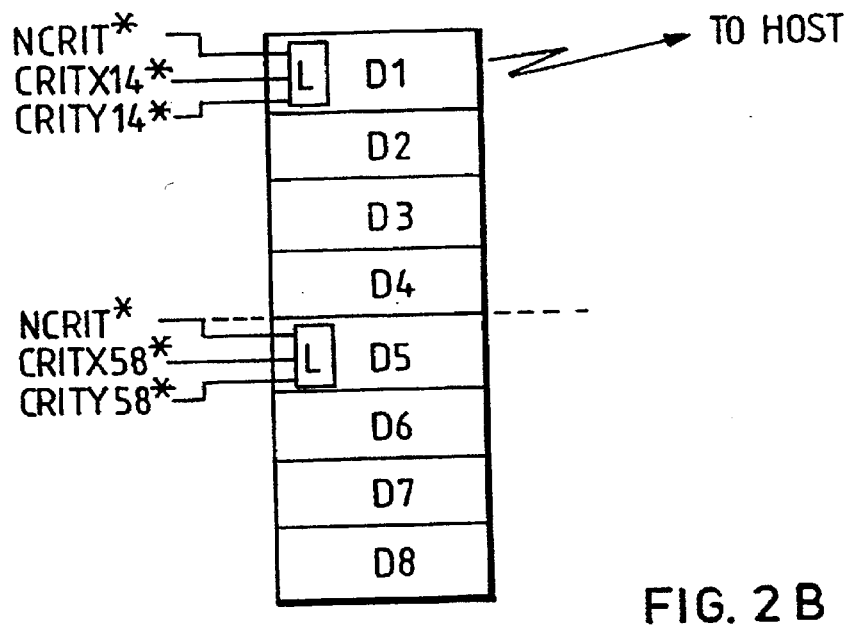
FIG. 2B shows, in schematic form, the input status signals to the disk drives of FIG. 1.

The response of the disk drives to the status signals from the fan monitor logic will now be described with reference to FIG. 2B. Each drive sees three input signals. For drives D1 through D4, the drive inputs are wired to signals NCRIT*, CRITX14* and CRITY14*. For drives D5 through D8, the inputs are wired to signals NCRIT*, CRITX58* and CRITY58*. In FIG. 2B, the signal wiring is shown only to drives D1 and D5 for the purposes of clarity. The wiring to D2, D3 and D4 is identical to that of D1 and the wiring to D6, D7 and D8 is identical to that of D5. The logic in the drive is designed to report a non-critical fault if any one of its inputs goes active (low). The fault is reported via the host data bus to indicate to a user of the system that a non-critical fault requiring remedial action has occurred. The drive logic will shut off drive motor power if any two of its inputs go active. It will be appreciated that it may not be desirable to shut off motor power immediately if the particular drive is in the middle of a data read or write operation. Provision for gradual shut down, not the subject of the present invention, may be made in these circumstances. The response of the disk drives to status signals from the fan monitor logic is summarized in Table II below:

TABLE 11

| INPUTS ACTIVE | DRIVE LOGIC ACTION |
|---|---|
| 0 | None |
| 1 | Report non-critical fault via host data bus |
| 2 | Shut (off drive motor power |
| 3 | Shut off drive motor power |

Figure 3A:
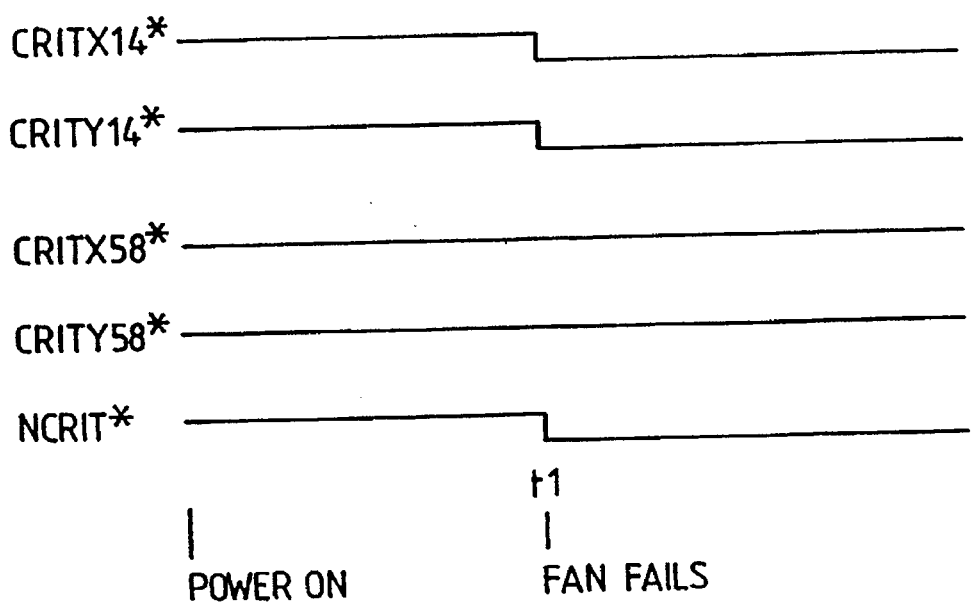
FIGS. 3A, 3B and 3C are waveform representations of the signals from the fan monitor logic for varying numbers of cooling fans.
Figure 3B:
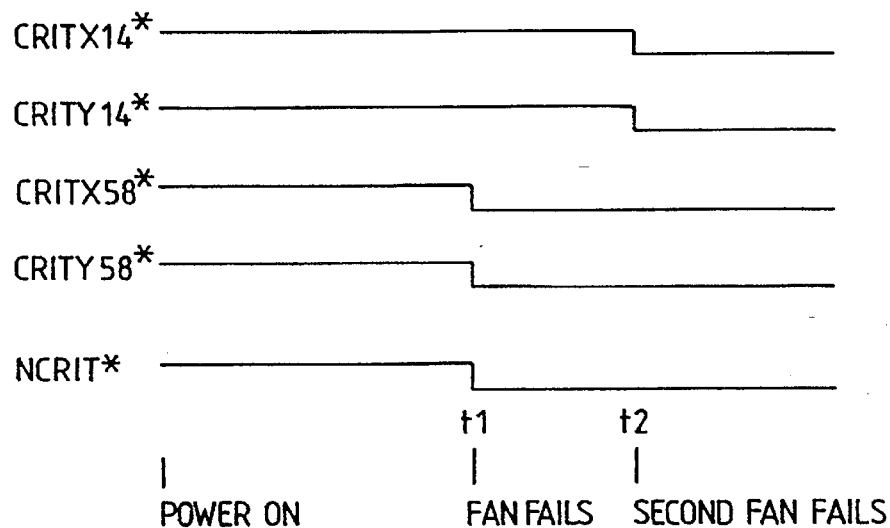
Figure 3C:
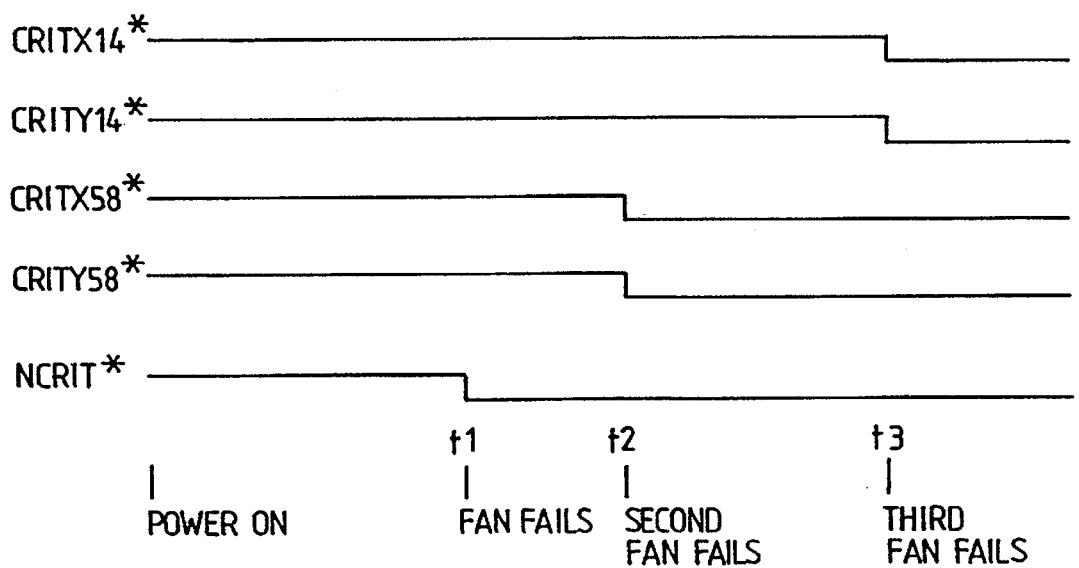

To further illustrate the operation of the system, waveforms for each fan configuration are shown in FIGS. 3A, 3B and 3C.

FIG. 3A shows the waveform for a single fan configuration wherein the single fan is associated with disk drives D1 through D4. At power-on, CRITX14* and CRITY14* are high and CRITX58* and CRITY58* are low. On failure of the single fan at time t1, the signal FANOK* goes high, thereby causing the fan monitor logic to force NCRIT*, CRITX14* and CRITY14* low. Thus all three of the inputs to the drives D1 through D4 go active causing a shut down in drive motor power. Note that CRITX58* and CRITY58* are held low at power-on and during the operation of the four drive system. Thus if an attempt is made to add a fifth drive (D5 for example) to this single fan system, these two status signals are active which will prevent activation of motor power to that drive.

FIG. 3B shows the signal waveforms for a two fan configuration. At power-on all five status signals are high. On failure of a fan at time t1, the signal FANOK* goes high to cause the fan monitor logic to force NCRIT*, CRITX58* and CRITY58* low. Thus shortly after time t1, all three signals to drives D5 through D8 go active causing all these drives to shut down. NCRIT* to drives D1 through D4 goes active thus causing the drives to report a non-critical fault. D1 through D4 can continue operation as they are still being adequately cooled by the remaining fan. On failure of the second fan at time t2 (assuming that the defective fan has not been replaced in the intervening period), CRITX14* and CRITY14* go active thereby causing drives D1 through D4 to shut down.

FIG. 3C shows the signal waveforms for a three fan configuration. At power-on all five status signals are high. On the failure of one fan at time t1, NCRIT* goes low which causes one of the inputs on all of the drives to go active. A non-critical error is reported and the system continues operation. At time t2, a second fan fails which causes CRITX58* and CRITY58* to go active thereby shutting down drives D5 through D8. Drives D1 through D4 continue operation. In the unlikely event that the remaining fan fails at time t3 and neither of the other defective fans has been replaced in the interim, the fan monitor logic causes CRITX14* and CRITY14* to go low thereby shutting down drives D1 through D4. The whole system is therefore shut down at this time.

Thus it can be seen that the fan monitor logic is capable of handling faults in any of the fans in various system configurations and ensuring continued operation of the system when there is sufficient cooling.

The fan monitor logic is further capable of handling faults which may occur in the fault signal generation logic itself. Any single failure on the fan monitor card could cause one of the five status signals to go active even if all the fans are operating normally. This is handled correctly because some or all of the disk drives will see one of their three inputs asserted and will report a non-critical cooling fault via the host data bus to the system user and also by means of a warning light, hard-wired to the disk drives. The system continues operation despite the failure in the fan monitor logic. However, if there were to be a subsequent fan failure before repair and replacement of the fan monitor logic, then the system would shut down thus ensuring that there is no overheating of the disk drives.

A circuit on the fan monitor card compares the output of circuit X and circuit Y; if the two outputs, e.g., CRITX14* and CRITY14* differ, then it can be seen from Table I that this implies a failure in one of the two logic circuits. A warning light on the defective fan monitor card is lit. This will be seen by the service engineer who will replace it.

As has been mentioned previously, a second fan monitor card, identical to the first, can advantageously be provided to allow repair and replacement of a defective card while maintaining operation of the system.

Thus the fan monitor logic of the present invention can provide fully fault-tolerant monitoring of any N+1 fan configuration. It contains no single point of failure.

We claim:

1. A cooling system for providing redundant cooling to electrical devices in an electrical apparatus, the cooling system comprising:
   a plurality N+1 individual cooling means, N cooling means being required to provide cooling of said devices; and
   monitor logic for monitoring the status of said plurality of cooling means, said logic being operable, in the event of a failure in said logic, to issue a non-critical warning to said electrical apparatus to thereby allow continued operation of said electrical apparatus.

2. A cooling system as claimed in claim 1, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

3. A cooling system as claimed in claim 2, said monitor logic being operable to generate a pair of status signals to each device, whereby in the event of a failure in a single cooling means or in the event of a failure in the monitor logic, one of said status signals is activated to cause said device to issue said non-critical fault warning.

4. A cooling system as claimed in claim 1, said monitor logic being further operable to issue a non-critical warning to said electrical apparatus in the event of failure of one of said cooling means.

5. A cooling system as claimed in claim 4, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

6. A cooling system as claimed in claim 5, said monitor logic being operable to generate a pair of status signals to each device, whereby in the event of a failure in a single cooling means or in the event of a failure in the monitor logic, one of said status signals is activated to cause said device to issue said non-critical fault warning.

7. A cooling system as claimed in claim 4, wherein the monitor logic is further operable, in the event of a subsequent failure of a second one of said cooling means, to issue a critical warning to said apparatus to thereby cause a shut down of said electrical devices.

8. A cooling system as claimed in claim 7, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

9. A cooling system as claimed in claim 8, said monitor logic being operable to generate a pair of status signals to each device, whereby in the event of a failure in a single cooling means or in the event of a failure in the monitor logic, one of said status signals is activated to cause said device to issue said non-critical fault warning.

10. A cooling system as claimed in claim 4, wherein the monitor logic is further operable, in the event of a subsequent failure of a second one of said cooling means, to issue a critical warning to said apparatus to thereby cause a shut down of a portion of said electrical devices.

11. A cooling system as claimed in claim 10, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

12. A cooling system as claimed in claim 11, said monitor logic being operable to generate a pair of status signals to each device, whereby in the event of a failure in a single cooling means or in the event of a failure in the monitor logic, one of said status signals is activated to cause said device to issue said non-critical fault warning.

13. A cooling system as claimed in claim 4, wherein the monitor logic is further operable, in the event of a subsequent failure of a second one of said cooling means, to issue a critical warning to said apparatus to thereby cause a shut down of a number of said electrical devices so that the remaining cooling means can provide the cooling for the electrical devices in operation.

14. A cooling system as claimed in claim 13, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

15. A cooling system as claimed in claim 14, said monitor logic being operable to generate a pair of status signals to each device, whereby in the event of a failure in a single cooling means or in the event of a failure in the monitor logic, one of said status signals is activated to cause said device to issue said non-critical fault warning.

16. A cooling system as claimed in claim 4, wherein the monitor logic is further operable, in the event of a subsequent failure of a second one of said cooling means, to issue a critical warning to said apparatus to thereby cause a shut down of a number of said electrical devices, said number corresponding to: total number of said electrical devices divided by N.

17. A cooling system as claimed in claim 16, wherein the monitor logic is operable to issue a plurality of status signals to each of said electrical devices connectable thereto, said status signals being indicative of the status of said plurality of cooling means, whereby on occurrence of a failure in said monitor logic, a change in one of said status signals to said devices causes an issuance by said devices of said non-critical fault warning.

18. A cooling system as claimed in claim 17, said monitor logic being operable to generate a pair of status signals to each device, whereby in the event of a failure in a single cooling means or in the event of a failure in the monitor logic, one of said status signals is activated to cause said device to issue said non-critical fault warning.

19. A data storage system comprising:

a plurality of disk data storage devices;

a plurality N+1 fan means for providing cooling in said system, N fan means being required to provide cooling of said data storage devices; and fan monitor means for monitoring the status of said fan means, operable in the event of a failure in said monitor means to issue a non-critical failure warning to said system.

20. A data storage system as described in claim 19 wherein said fan monitor means issues a critical warning to said system to thereby cause a shut down of said plurality of disk drive storage devices when the number of operating fan means is not capable of cooling the plurality of disk data storage devices.

21. A data storage system as described in claim 19 wherein said fan monitor means issues a critical warning to said system to thereby cause a shut down of a number of said plurality of disk drive storage devices, the number of disk drive storage devices remaining in operation capable of being cooled by the number of unfailed fan means.

* * * * *

UNITED STATES PATENT AND TRADEMARK OFFICE
CERTIFICATE OF CORRECTION

PATENT NO. : 5,668,532
DATED : September 16, 1997
INVENTOR(S) : Reginald Beer, Stanley J. Cutts, Steven B. Kew, Neil Morris, and David Newmarch It is certified that error appears in the above-indentified patent and that said Letters Patent is hereby corrected as shown below:

Claim 4, Col. 6, Line 27, "warming" should be --warning--.

Signed and Sealed this

Twenty-fifth Day of November, 1997

Attest:

BRUCE LEHMAN

Attesting Officer

Commissioner of Patents and Trademarks